E. H. BINNS.
AUTOMOBILE BODY.
APPLICATION FILED DEC. 12, 1912.

1,086,128.

Patented Feb. 3, 1914.

WITNESSES

INVENTOR
EDWARD H. BINNS
BY
ATTORNEY

UNITED STATES PATENT OFFICE.

EDWARD H. BINNS, OF PITTSBURGH, PENNSYLVANIA.

AUTOMOBILE-BODY.

1,086,128.

Specification of Letters Patent.

Patented Feb. 3, 1914.

Application filed December 12, 1912. Serial No. 736,351.

*To all whom it may concern:*

Be it known that I, EDWARD H. BINNS, a citizen of the United States, residing at Pittsburgh, in the county of Allegheny, State of Pennsylvania, have invented certain new and useful Improvements in Automobile-Bodies, of which the following is a specification.

My invention relates to inclosed automobile bodies of the limousine and related types, and has for its objects, first, to provide additional head room in the passenger compartment, or "coach"; second, to beautify the exterior contours of the body, and third, to provide a tire trunk, so located that its outlines blend harmoniously with those of the body, and which at the same time is very accessible.

To these ends I elevate the coach roof, comparatively speaking, or depress the cab roof, or both, and I then locate the tire trunk on the cab roof in a convenient and inconspicuous position.

Figures 2, 3:
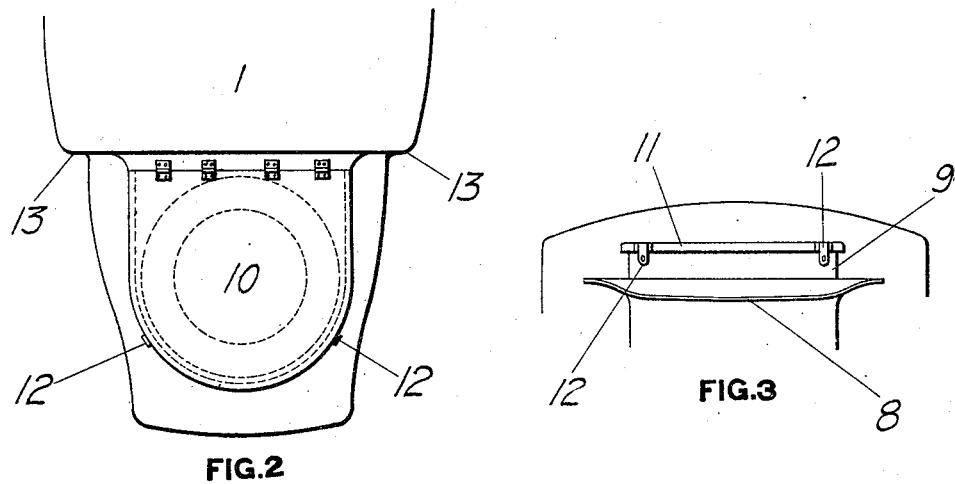
Figure 1:
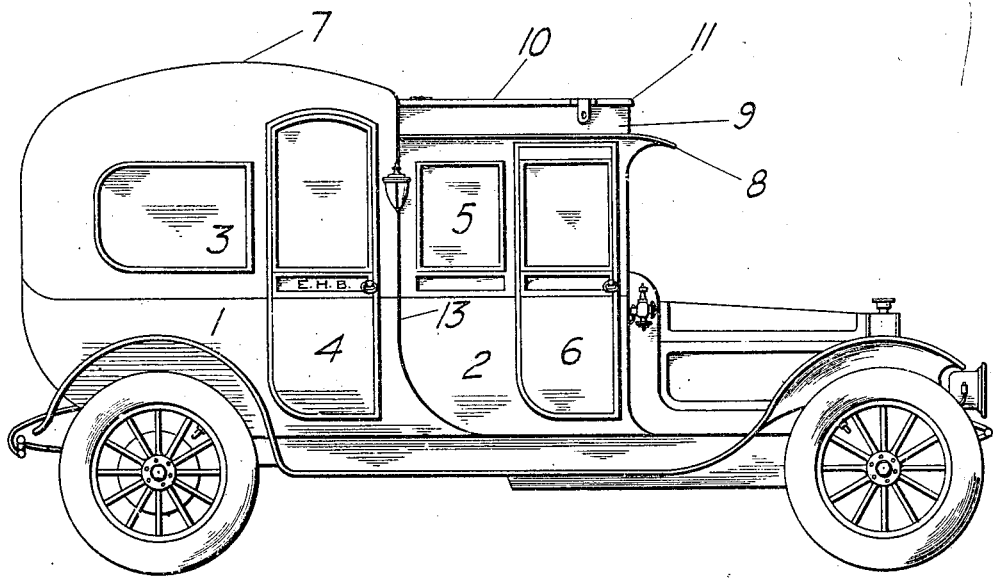

Referring to the drawings, Figure 1 is a side elevation of a motor car having a limousine body according to my invention. Fig. 2 is a plan view of the cab roof and tire trunk. Fig. 3 is a front elevation of the cab roof and tire trunk.

My improved automobile body consists of a coach 1 and a cab 2. The coach 1 is provided with windows 3, and one or more doors 4. The cab 2 may be provided with a pair of windows 5, and one or more doors 6. The coach roof 7 is carried to a higher level than usual, and the cab roof 8 is considerably lower than the coach roof 7, the difference being ordinarily from eight inches to a foot. Between the roofs 7 and 8 there is an abrupt offset, or corner, 9. The tire trunk 10 is located on the roof 8, and provided with a hinged cover 11, which may be secured by suitable latches or locks 12. The tire trunk 10 is of sufficient size to carry an extra tire, or a spare wheel, and other accessories, and instead of being of the usual circular shape, is given the contour shown in Fig. 2 to effect a more harmonious combination with the roof lines of the coach and cab.

The cab is preferably of less width than the front end of the coach, as shown in Fig. 2, and the corners 13 represent a more or less abrupt change in contour sidewise between the coach and the cab, room for two persons side by side being ample in the cab, whereas it is desired that three may sit comfortably on the rear seat of the coach.

My invention as above described attains the objects hereinbefore stated by increasing the comfort of the passengers, adding to the grace and beauty of the vehicle, and providing a convenient receptacle for tires and other accessories which may be conveniently reached without disturbing any of the occupants.

Various changes in detail may be made by skilled constructors without departing from the spirit of my invention, as covered by the following claim.

I claim,

An automobile body, comprising a coach and a cab, a roof for the coach at one level, said roof having an unbroken surface covering the entire coach, a roof for the cab at a lower level, and a tire trunk on the cab roof, the top of said trunk being below the roof line of the coach, whereby additional head room is provided in the coach and storage space on the cab roof.

In testimony whereof I hereunto affix my signature in the presence of two witnesses.

EDWARD H. BINNS.

Witnesses:
ROBT. L. WICKLINE,
A. M. BLACK.